United States Patent
Ko

(10) Patent No.: US 8,952,957 B2
(45) Date of Patent: Feb. 10, 2015

(54) THREE-DIMENSIONAL DISPLAY APPARATUS

(75) Inventor: Chueh-Pin Ko, New Taipei (TW)

(73) Assignee: Acer Incorporated, New Taipei (TW)

( * ) Notice: Subject to any disclaimer, the term of this patent is extended or adjusted under 35 U.S.C. 154(b) by 441 days.

(21) Appl. No.: 13/352,300

(22) Filed: Jan. 17, 2012

(65) Prior Publication Data

US 2013/0050193 A1    Feb. 28, 2013

(30) Foreign Application Priority Data

Aug. 23, 2011    (TW) .............................. 100130088 A

(51) Int. Cl.
| G06T 15/00 | (2011.01) |
| H04N 13/00 | (2006.01) |
| G02B 27/22 | (2006.01) |
| G02B 27/26 | (2006.01) |
| H04N 13/04 | (2006.01) |

(52) U.S. Cl.
CPC ........ H04N 13/0033 (2013.01); G02B 27/2264 (2013.01); G02B 27/26 (2013.01); H04N 13/0438 (2013.01)
USPC ........ 345/419; 345/4; 345/5; 348/51; 348/53; 349/5; 349/15; 349/96

(58) Field of Classification Search
CPC .......... H04N 13/0434; H04N 13/0438; H04N 13/0033; G02B 27/26; G02B 27/2264
USPC ........ 345/4, 5, 419; 348/51, 53; 349/5, 15, 96
See application file for complete search history.

(56) References Cited

U.S. PATENT DOCUMENTS

| 5,629,798 | A | 5/1997 | Gaudreau |
| 5,933,127 | A | 8/1999 | DuBois |
| 7,705,935 | B2 * | 4/2010 | Gaudreau ........................ 349/96 |
| 8,044,879 | B2 * | 10/2011 | Matveev et al. ................... 345/4 |
| 8,177,366 | B2 * | 5/2012 | Lee et al. ........................... 353/7 |
| 8,587,639 | B2 * | 11/2013 | Matthews ........................ 348/51 |
| 2003/0063383 | A1 | 4/2003 | Costales |

FOREIGN PATENT DOCUMENTS

| CN | 1181563 | 5/1998 |
| CN | 1930605 | 3/2007 |
| DE | 19510671 | 10/1996 |
| EP | 0845911 | 6/1998 |
| TW | 201017221 | 5/2010 |
| WO | 9825414 | 6/1998 |
| WO | 2005069269 | 7/2005 |
| WO | 2010047241 | 4/2010 |

OTHER PUBLICATIONS

"Office Action of European Counterpart Application", issued on Nov. 7, 2013, p. 1-p. 8.

\* cited by examiner

*Primary Examiner* — Phu K Nguyen
(74) *Attorney, Agent, or Firm* — Jianq Chyun IP Office

(57) ABSTRACT

A three-dimensional display apparatus includes a display panel, a display driver, an active polarizing layer, and an active polarizer. The display driver controls the display panel to display input image data categorized into data containing pixels in a first state, a second state, and a third state. The active polarizing layer is located on the display panel. The active polarizer controls the polarization direction of the active polarizing layer to enable the image displayed on the display panel to have the polarization direction after passing through the active polarizing layer. The active polarizing layer has first, second, and third polarization directions respectively corresponding to the pixels in the first state, the second state, and the third state in the display panel.

20 Claims, 11 Drawing Sheets

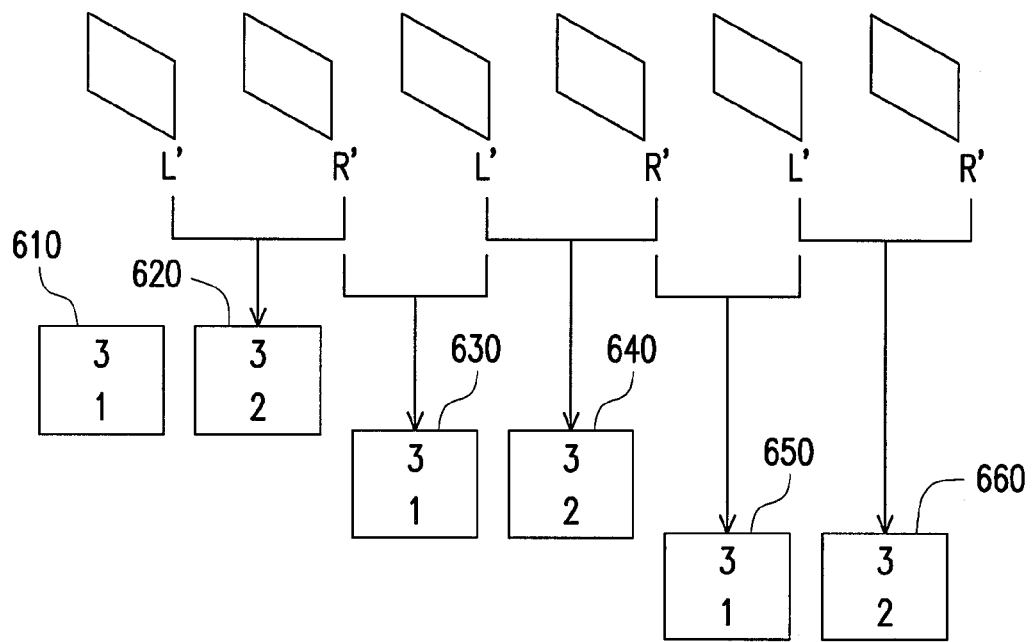
FIG. 6
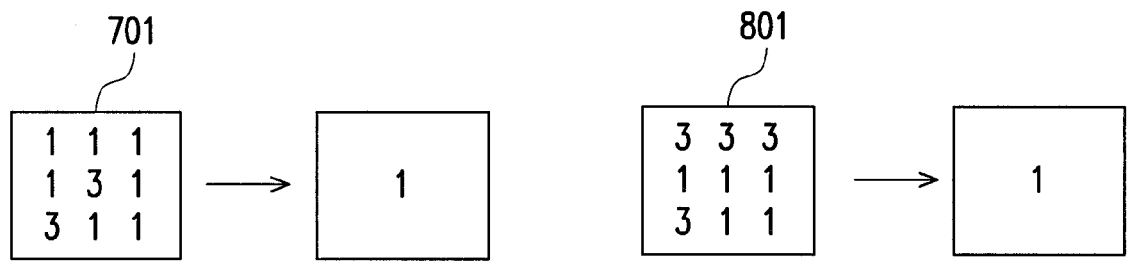
FIG. 8
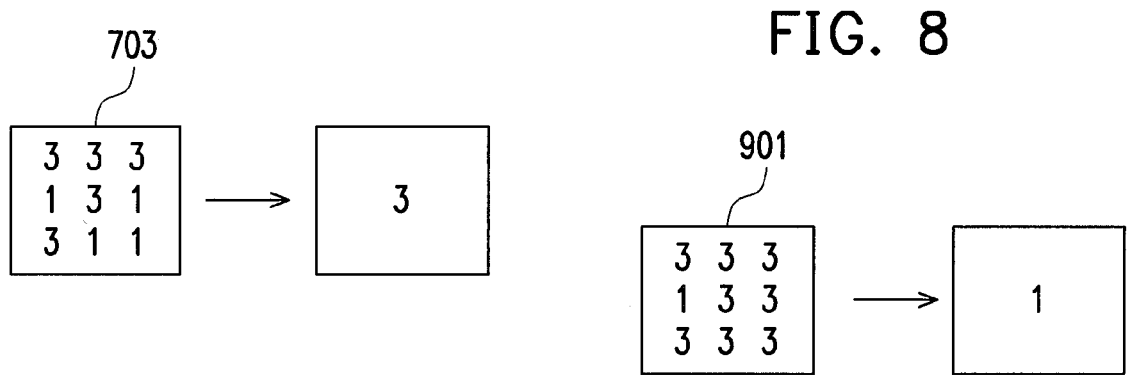
FIG. 7
FIG. 9

(a)

(b)

(c)

(d)

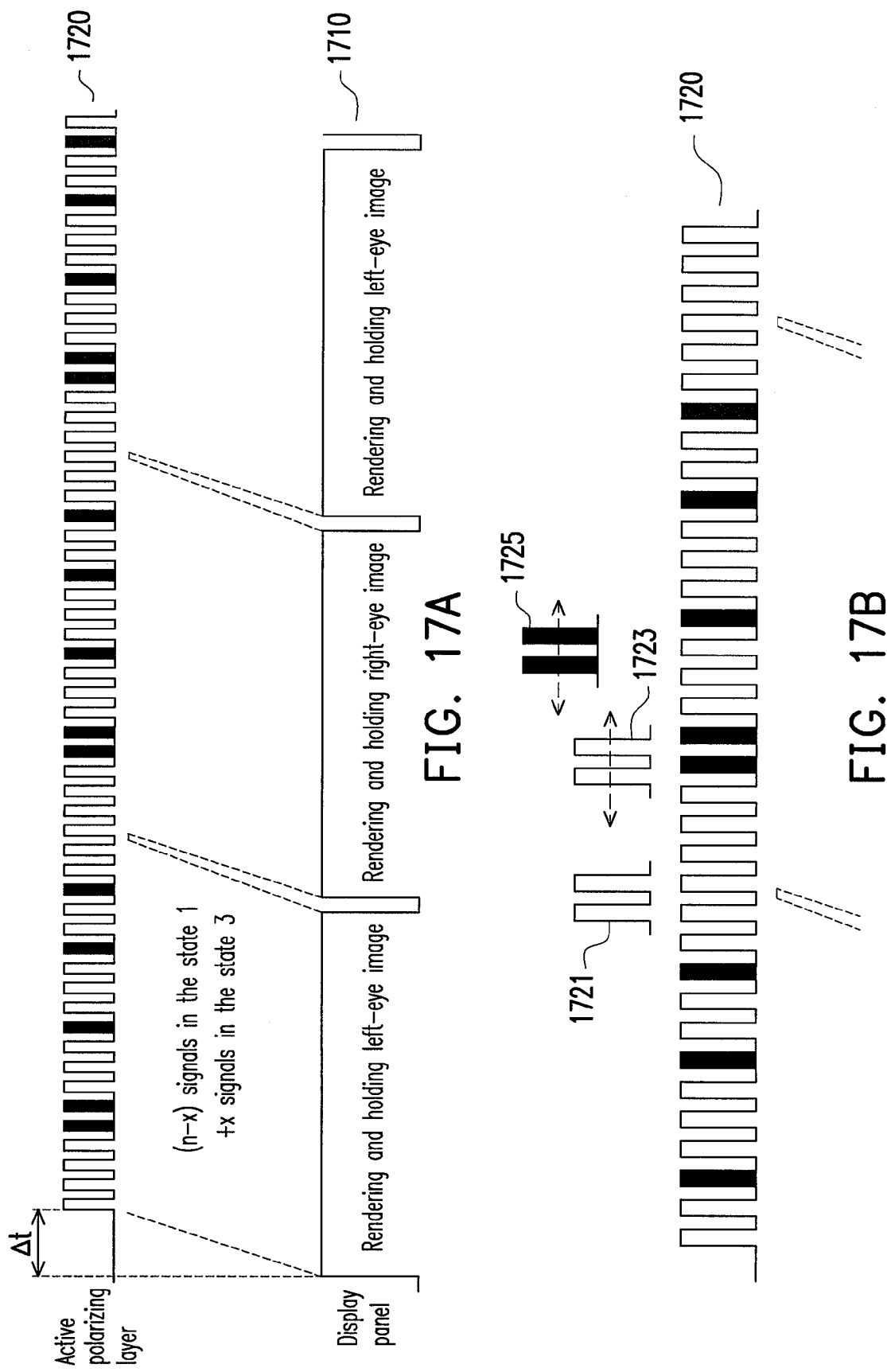

THREE-DIMENSIONAL DISPLAY APPARATUS

CROSS-REFERENCE TO RELATED APPLICATION

This application claims the priority benefit of Taiwan application serial No. 100130088, filed on Aug. 23, 2011. The entirety of the above-mentioned patent application is hereby incorporated by reference herein and made a part of this specification.

BACKGROUND OF THE INVENTION

1. Field of the Invention

The invention generally relates to a three-dimensional (3D) display apparatus, and more particularly, to a 3D display apparatus with active polarization. Description of Related Art Nowadays, three-dimensional (3D) display has become more and more prevalent. 3D imaging and display techniques are categorized into glasses 3D techniques and glassless 3D techniques. The glasses 3D techniques can be further categorized into shutter 3D techniques and polarized 3D techniques. The shutter 3D techniques and the polarized 3D techniques respectively have their own advantages and disadvantages. However, none of the existing glasses 3D techniques can offer the advantages of both the shutter and polarized 3D techniques. For instance, shutter glasses offer high resolution but are expensive, flicker-prone, easily interfered by infrared rays, and offer low 3D display brightness, while polarized glasses are less expensive, free of flickers and infrared interference, and offer high 3D display brightness but offer only half the resolution of that offered by the shutter glasses.

In a conventional 3D display technique, each of the 3D image data is theoretically considered an independent left-eye's view or an independent right-eye's view. When the image data are played, images at different viewing angles are accepted by the left and right eyes of a viewer and combined into 3D images with depth information in the viewer's brain. Thus, a stereo vision is produced. Since none of the existing techniques optimizes the image data, even though these techniques are very simple, the flickering issue of the shutter glasses cannot be resolved, and the low resolution resulting from the polarized glasses cannot be improved.

Generally, every existing design is based on either the left-eye's view only or the right-eye's view only. Namely, data representing a left-eye's view are shown to the left eye of a viewer at one moment, and data representing a right-eye's view are shown to the right eye of the viewer at another moment. The frequency of images which are received by a single eye is approximately 50 Hz or 60 Hz. Flickers may be sensed by a viewer if the image update frequency is not high enough. Thus, one may feel dizzy or fatigued after viewing 3D images.

How to resolve the flickering issue and improve 3D display quality to reduce discomfort of a viewer has become a major research topic in the industry.

SUMMARY OF THE INVENTION

The invention is directed to a three-dimensional (3D) display apparatus. In the invention, a pixel on a display panel has a polarizing direction, and the polarizing direction is changed by an active polarizer configured on the display panel. Thereby, flickers can be reduced when the 3D display apparatus converts the left-eye image or the right-eye image into the other.

In an embodiment of the invention, a 3D display apparatus is provided. The 3D display apparatus includes a display panel, a display driver, an active polarizing layer, and an active polarizer. The display driver is coupled to the display panel and serves to control the display panel to display input image data. The input image data are categorized into data of a plurality of pixels in a first state, a second state, and a third state. The active polarizing layer is located on the display panel. The active polarizer is coupled to the active polarizing layer and serves to control a polarization direction of the active polarizing layer to enable an image displayed on the display panel to have the polarization direction after the image passes through the active polarizing layer. Here, the polarization direction of the active polarizing layer is changed to a first polarization direction in response to the pixels in the first state in the display panel, changed to a second polarization direction in response to the pixels in the second state in the display panel, and changed to a third polarization in response to the pixels in the third state in the display panel.

According to an embodiment of the invention, the 3D display apparatus further includes a similarities and dissimilarities analyzer that receives original image data and converts the original image data into the input image data. Here, the input image data include first image data and second image data. The pixels in the first image data and the second image data respectively have a coordinate represented by P1(Z1) and P2(Z2). Here, Z1 and Z2 respectively indicate the first state and the second state, the pixel in the first state is played for generating a left-eye vision to a viewer, and the pixel in the second state is played for generating a right-eye vision to the viewer. The similarities and dissimilarities analyzer further analyzes the pixel P1(Z1) and the pixel P2(Z2). When a data difference between the pixel P1(Z1) and the pixel P2(Z2) is smaller than a threshold, the pixel P1(Z1) is changed to P1(Z3), the pixel P2(Z2) is changed to P2(Z3), or the pixels P1(Z1) and P2(Z2) are respectively changed to P1(Z3) and P2(Z3). Here, Z3 indicates the third state, and the pixel in the third state is played for generating a double-eye vision to the viewer.

According to an embodiment of the invention, the 3D display apparatus further includes a similarities and dissimilarities analyzer that receives original image data and converts the original image data into the input image data. The input image data include first image data and second image data. Here, the first image data and the second image data respectively have a matrix with M*N pixels. The pixels in the ith rows and the jth columns of the first image data and the second image data are respectively indicated as P1(i, j, Z1) and P2(i, j, Z2), i and j are integers, $1 \leq i \leq M$, and $1 \leq j \leq N$. Z1 and Z2 respectively indicate the first state and the second state. The pixel in the first state is played for generating a left-eye vision to a viewer, and the pixel in the second state is played for generating a right-eye vision to the viewer.

The pixel P1(i, j, Z1) and the pixel P2(i, j, Z2) in the $i^{th}$ rows and the $j^{th}$ columns are analyzed. If a data difference between the pixel P1(i, j, Z1) and the pixel P2(i, j, Z2) is smaller than a threshold, the pixel P1(i, j, Z1) is changed to P1(i, j, Z3), the pixel P2(i, j, Z2) is changed to P2(i, j, Z3), or the pixels P1(i, j, Z1) and P2(i, j, Z2) are respectively changed to P1(i, j, Z3) and P2(i, j, Z3). Here, Z3 indicates a third state, and the pixel in the third state is played for generating a double-eye vision to the viewer.

In order to make the aforementioned and other features and advantages of the invention more comprehensible, embodiments accompanying figures are described in detail below.

BRIEF DESCRIPTION OF THE DRAWINGS

The accompanying drawings constituting a part of this specification are incorporated herein to provide a further understanding of the invention. Here, the drawings illustrate embodiments of the invention and, together with the description, serve to explain the principles of the invention.

FIG. 6 is a schematic diagram illustrating two image data before and after adjustment.

FIG. 7, FIG. 8, and FIG. 9 are schematic diagrams illustrating the control of three blocks according to an embodiment of the invention.

FIG. 17A to FIG. 17C are schematic diagrams illustrating driving signals of an active polarizing layer and a display panel according to an embodiment of the invention.

DESCRIPTION OF EMBODIMENTS

Figure 1A:
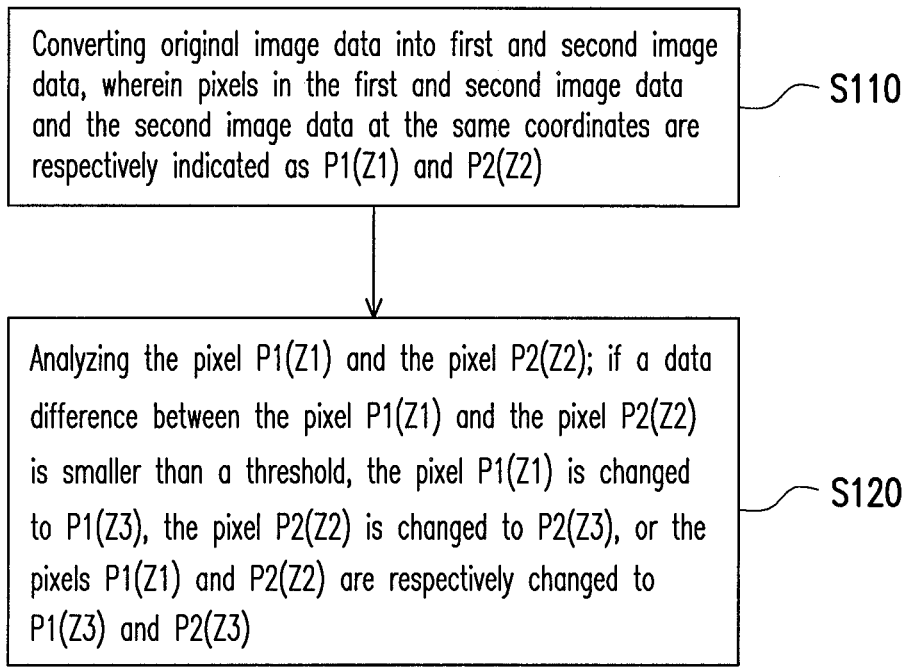
FIG. 1A is a flowchart illustrating a method for improving three-dimensional (3D) display quality according to an embodiment of the invention.

References will now be made in detail to the present embodiments of the invention, examples of which are illustrated in the accompanying drawings. Wherever possible, the same reference numbers are used in the drawings and the description to refer to the same or like parts.

The existing three-dimensional (3D) original image data can be categorized into 3D images and 3D information. Image data of the 3D images may be full frame data. Image data of the 3D information may be the 3D contents of a Blu-ray disc, wherein the 3D contents are multi-view video coding (MVC) data. Besides, the image data of the 3D information may also be 2D+depth data. Thus, first and second image data for left/right-eye's views can be generated according to 3D original image data. Here, the left-eye's view and the right-eye's view are independent views.

In a conventional 3D display technique, each of the image data is associated with a single eye of a viewer. Namely, image data are either the data of a left-eye's view or the data of a right-eye's view, and there is no data of double-eye's view.

Define Three States

In this embodiment, a pixel-based adjustment method for improving 3D display quality is provided. First, definitions of the three states are provided below. Pixels in the first state serve to generate a left-eye vision, pixels in the second state serve to generate a right-eye vision, and pixels in the third state serve to generate a double-eye vision. The third state is different from the first state and the second state. When the pixels in the third state are played, data can be received by both left and right eyes of a viewer. In addition, the pixels in the first, second, or third state can be indirectly presented in a viewer's vision through 3D glasses. Here, the 3D glasses may be 3D active glasses or 3D passive glasses, while the invention is not limited thereto.

FIG. 1A is a flowchart illustrating a method for improving 3D display quality according to an embodiment of the invention. Please refer to FIG. 1A. In step S110, original image data are converted into first and second image data. Pixels in the first image data and the second image data at the same coordinates are respectively indicated as P1(Z1) and P2(Z2). Here, Z1 and Z2 respectively indicate the first state and the second state, the pixel P1(Z1) in the first state is played for generating a left-eye vision to the viewer, and the pixel P2(Z2) in the second state is played for generating a right-eye vision to the viewer. It should be mentioned that the first image data and the second image data can be defined as left-eye data and right-eye data at the same time (e.g., in a top and bottom (TnB) or side-by-side (SbS) image format) or left-eye data and right-eye data at different time. However, the invention is not limited thereto.

Then, in step S120, the pixel P1(Z1) and the pixel P2(Z2) are analyzed. If a data difference between the pixel Pl(Z1) and the pixel P2(Z2) is smaller than a threshold, the pixel P1(Z1) is changed to P1(Z3), the pixel P2(Z2) is changed to P2(Z3), or the pixels P1(Z1) and P2(Z2) are respectively changed to P1(Z3) and P2(Z3). Here, Z3 indicates the third state, and the pixel in the third state is played for generating a double-eye vision to the viewer.

Figure 1B:
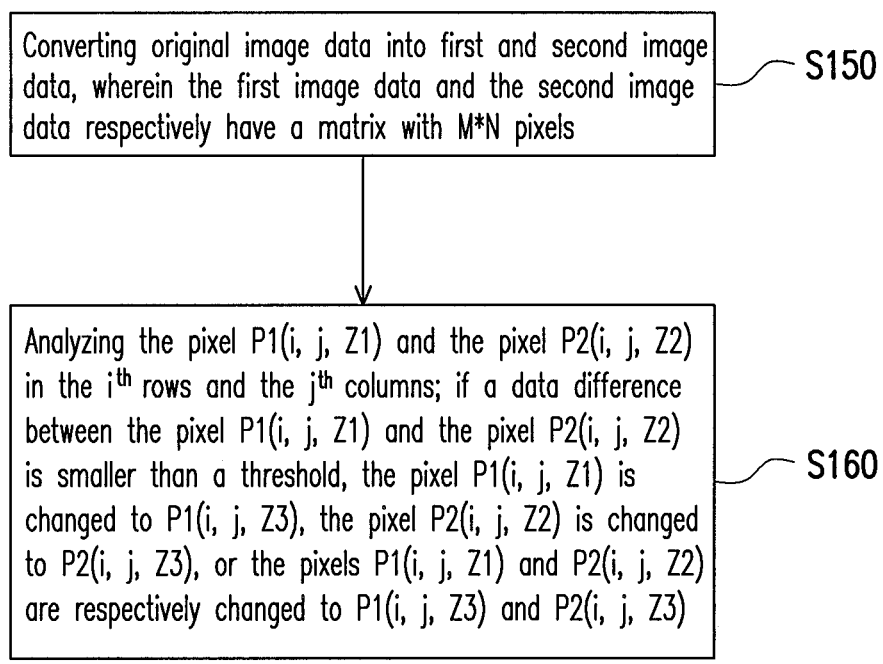
FIG. 1B is a flowchart illustrating a method for improving 3D display quality according to another embodiment of the invention.

FIG. 1B is a flowchart illustrating a method for improving 3D display quality according to another embodiment of the invention. Please refer to FIG. 1B. In step S150, original image data are converted into first and second image data. The first image data and the second image data respectively have a matrix with M*N pixels, pixels in the $i^{th}$ rows and the $j^{th}$ columns of the first image data and the second image data are respectively indicated as P1(i, j, Z1) and P2(i, j, Z2), wherein i and j are integers, $1 \leq i \leq M$, $1 \leq j \leq N$, and Z1 and Z2 respectively indicate a first state and a second state. The pixel P1(i, j, Z1) in the first state is played for generating a left-eye vision to a viewer, and the pixel P2(i, j, Z2) in the second state is played for generating a right-eye vision to the viewer. The pixel P1(i, j, Z1) and the pixel P2(i, j, Z2) may be left-eye data and right-eye data displayed on a display at the same time. Alternatively, the pixel P1(i, j, Z1) and the pixel P2(i, j, Z2) may also be left-eye data and right-eye data respectively displayed on a display at different time.

Next, in step S160, the pixel P1(i, j, Z1) and the pixel P2(i, j, Z2) in the $i^{th}$ rows and the $j^{th}$ columns are analyzed. If a data difference between the pixel P1(i, j, Z1) and the pixel P2(i, j, Z2) is smaller than a threshold, the pixel P1(i, j, Z1) is changed to P1(i, j, Z3), the pixel P2(i, j, Z2) is changed to P2(i, j, Z3), or the pixels P1(i, j, Z1) and P2(i, j, Z2) are respectively changed to P1(i, j, Z3) and P2(i, j, Z3). Here, Z3 indicates a third state, and the pixel in the third state is played for generating a double-eye vision to the viewer.

The original image data may be full frame data, MVC data of a Blu-ray disc, or 2D+depth data, which should not be construed as a limitation to the invention. Here, the MVC data are compressed data of a primary image and compressed data of a secondary image. A complete 2D left-eye image can be generated by the compressed data of the primary image, while a 2D right-eye image can only be generated by the compressed data of both the secondary image and the primary image. In other embodiments, the 2D+depth data are first converted into the left-eye image data and the right-eye image data, and image data in the third state Z3 are then generated according to the left-eye image data and the right-eye image data. In this embodiment, depth information of the 2D+depth data is analyzed, and whether to directly convert a corresponding pixel in a 2D frame of the 2D+depth data into the third state Z3 is determined according to the depth information of the 2D+depth data. If the corresponding pixel is not in the third state Z3, the image data of the corresponding pixel in the 2D frame are converted into image data of a left-eye vision and image data of a right-eye vision according to the depth information.

For instance, if the depth information indicates that the depth of a specific pixel is within a predetermined range, or that the grayscale value of the pixel in a depth map is within a specific predetermined range, the corresponding pixel in the 2D frame is directly converted into the image data in the third state Z3. If the grayscale value of the pixel in the depth map is not within the predetermined range, the image data of the pixel in the 2D frame are converted into image data of a left-eye vision and image data of a right-eye vision for 3D display according to the depth data (grayscale value) of the pixel in the depth map. Hence, in this embodiment, the original image data can be converted into the first image data and the second image data according to an existing conversion format.

Method for Adjusting 3D Images

Figure 2:
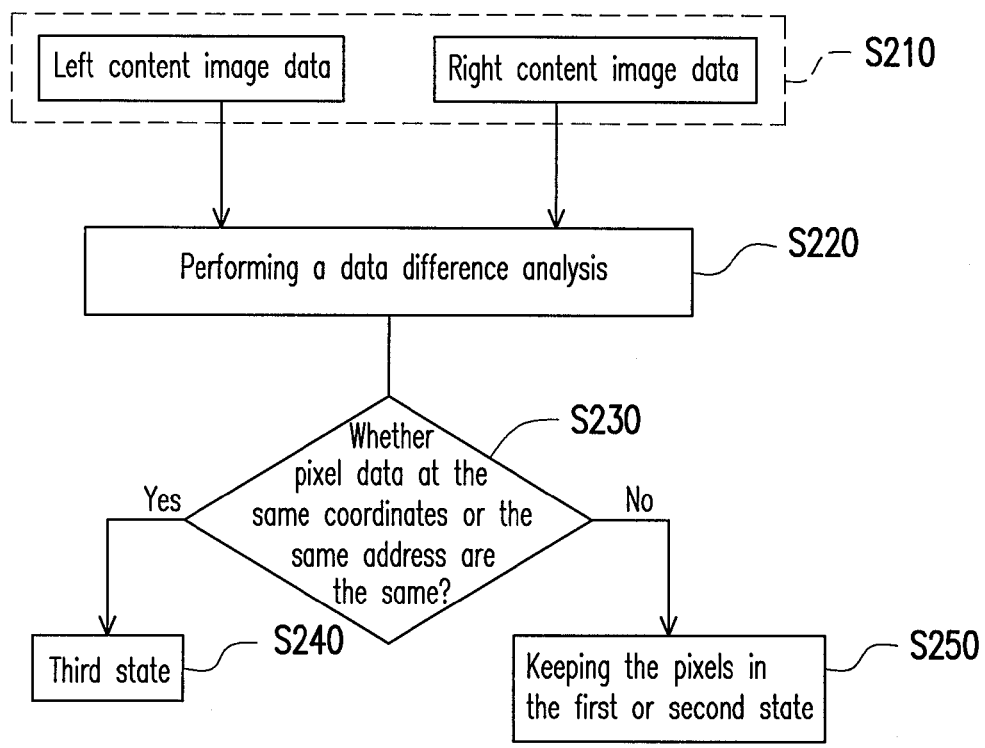
FIG. 2 is a flowchart illustrating a method for adjusting a 3D image according to an embodiment of the invention.

FIG. 2 is a flowchart illustrating a method for adjusting a 3D image according to an embodiment of the invention. Please refer to FIG. 2. With reference to the descriptions related to the embodiment illustrated in FIG. 1, in step S210, if the original image data is full frame data, left content image data and right content image data are generated. Here, the left content image data and the right content image data are respectively equivalent to the first image data and the second image data in FIG. 1. In step S220, data difference analysis is performed by using a similarities and dissimilarities analyzer, wherein the similarities and dissimilarities analyzer can be implemented as a scalar or a timing controller shown in an image or as a software along with an operation circuit. In step S230, the pixel P1(Z1) in the first image data and the pixel P2(Z2) in the second image data are analyzed, or the pixel P1(i, j, Z1) and the pixel P2(i, j, Z2) in the $i^{th}$ rows and the $j^{th}$ columns are analyzed.

If in step S230 it is determined that the data difference between the pixel P1(Z1) and the pixel P2(Z2) is smaller than a threshold (for instance, the two pixel data are the same), step S240 is executed to change the pixel P1(Z1) to P1(Z3), change the pixel P2(Z2) to P2(Z3), or change the pixels P1(Z1) and P2(Z2) respectively to P1(Z3) and P2(Z3). In another embodiment, if it is determined in step S230 that the data difference between the pixel P1(i, j, Z1) and the pixel P2(i, j, Z2) is smaller than a threshold (for instance, the two pixel data are the same), step S240 is executed to change the pixel P1(i, j, Z1) to P1(i, j, Z3), change the pixel P2(i, j, Z2) to P2(i, j, Z3), or change the pixels P1(i, j, Z1) and P2(i, j, Z2) respectively to P1(i, j, Z3) and P2(i, j, Z3). If it is determined in step S230 that the two pixel data at the same coordinates are not the same (i.e., the data difference between the two pixel data is greater than the threshold), step S250 is executed, in which the pixels remain in their original first state or second state. Here, Z1-Z3 respectively indicate the first to the third state, and the pixel in the third state is played for generating a double-eye vision to the viewer.

Method for Adjusting 3D Information

Figure 3:
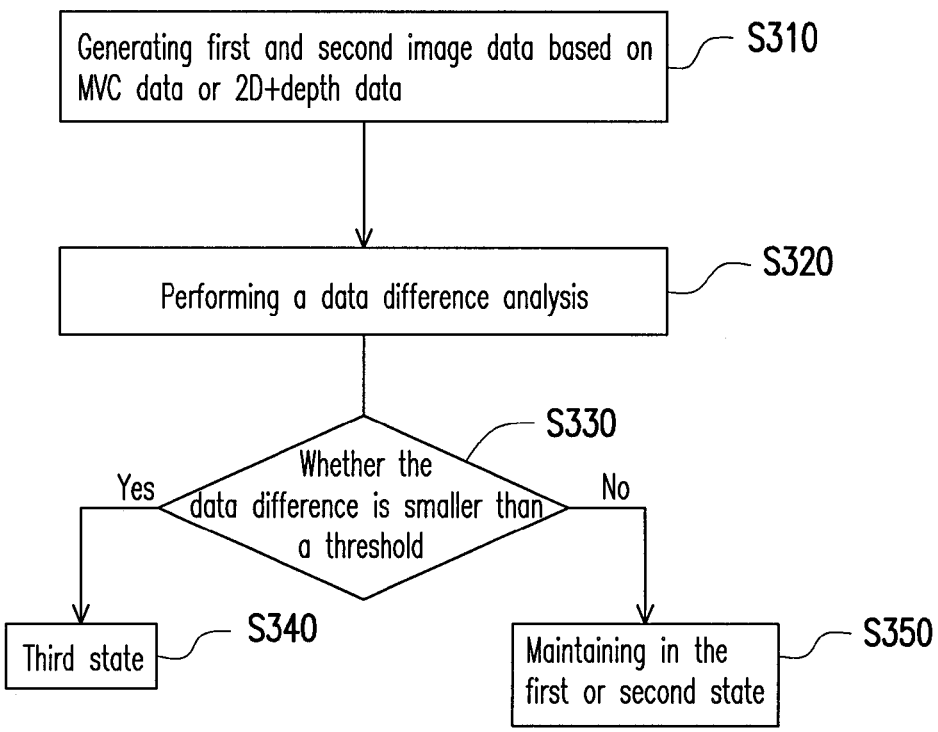
FIG. 3 is a flowchart illustrating a method for adjusting 3D information according to an embodiment of the invention.

FIG. 3 is a flowchart illustrating a method for adjusting 3D information according to an embodiment of the invention. Please refer to FIG. 3. With reference to the descriptions related to the embodiment illustrated in FIG. 1, in step S310, if the original image data are the MVC data or the 2D+depth data, the first image data and the second image data are generated according to an existing conversion format. In step S320, a data difference analysis is performed by using a similarities and dissimilarities analyzer, wherein the similarities and dissimilarities analyzer can be implemented as a scalar or a timing controller shown in an image or as a software along with an operation circuit. In step S330, a pixel P1(i, j, Z1) and a pixel P2(i, j, Z2) in the $i^{th}$ rows and the $j^{th}$ columns are analyzed. If the data difference between the two pixels is smaller than a threshold, step S340 is executed to change the pixel P1(i, j, Z1) to P1(i, j, Z3) or change the pixel P2(i, j, Z2) to P2(i, j, Z3). If the data difference between the two pixels exceeds the threshold, step S350 is executed, in which the pixels remain at their original first state or second state. Here, Z1-Z3 respectively indicate the first to the third state, and the pixel in the third state is played for generating a double-eye vision to the viewer.

About Luminance Unit of Three Primary Colors

Commission internationale de l'éclairage (CIE) specifies that the wavelengths of the primary red, green, and blue colors are respectively 700 nm, 546.1 nm, and 435.8 nm. In the color matching experiment, an equal-energy white light is obtained when the relative luminance ratio of the three primary colors is 1.0000:4.5907:0.0601. Thus, CIE defines this ratio as the unit quantity of the red, green, and blue primary colors (i.e., (R):(G):(B)=1:1:1). Even though herein the three primary colors have different luminance, CIE treats the luminance of each primary color as a unit, so that a white light is obtained in the additive color mixing process by mixing the red, green, and blue primary colors in equal proportion (i.e., (R)+(G)+(B)=(W)).

About DeltaE

DeltaE is usually used for describing the slightest color and hue variation detectable to human eyes. DeltaE specifies a range tolerable to human perception. Generally, a deltaE variation between 3 and 6 units is acceptable. The color effects within different deltaE ranges are different. For instance, if deltaE=1.6-3.2 units, the color variation is not detectable to human eyes. If deltaE=3.2-6.5 units, the color variation can only be detected by professionally trained printers. If deltaE=6.5-13 units, the color variation can be detected but the hue variation is still not detectable. If deltaE=13-25 units, different hues and color dependencies can be identified. If deltaE exceeds 25 units, a totally different color is presented.

About Threshold Range

Whether the pixel data in the third state are different can be determined through analysis or detection. For instance, whether the contents of a pixel at an original position are updated or maintained can be determined, or the threshold may be a grayscale variation within a specific grayscale range. Thus, the two pixel data can be considered the same if following conditions are met in the step of analyzing the pixel P1(i, j, Z1) and the pixel P2(i, j, Z2): (1) when the grayscale variations of the two pixels are smaller than 10 grayscale units; (2) when the luminance variations of the two pixels are smaller than 5 luminance units; (3) when the deltaE of the two pixels is smaller than 1 deltaE unit. Note that the present implementation is only an example and is not intended to limit the invention. The two pixel data may be considered the same if only one or two of the foregoing conditions are met, or the range of the grayscale variation, the luminance variation, or deltaE may be changed according to the actual design requirement.

About Pixel-Based Image Data

Figure 4A:
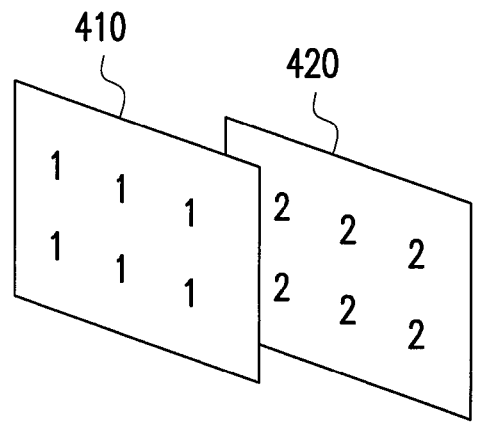
FIG. 4A is a schematic diagram illustrating image data generated in step S110 in FIG. 1 according to an embodiment of the invention.

FIG. 4A is a schematic diagram illustrating image data generated in step S110 in FIG. 1 according to an embodiment of the invention. Please refer to FIG. 4A. According to this embodiment, in order to indicate the pixel state in each image data, the digits 1, 2, and 3 respectively denote the first state, the second state, and the third state. In step S110, a plurality of image data (for instance, first image data 410 and second image data 420) can be generated. All the pixels of the first image data 410 are in the first state. Namely, the first image data 410 constitute a left-eye's view and generate a left-eye vision to a viewer when the first image data 410 are played. All the pixels of the second image data 420 are in the second state. Namely, the second image data 420 constitute a right-eye's view and generate a right-eye vision to the viewer when the second image data 420 are played.

Figure 4B:
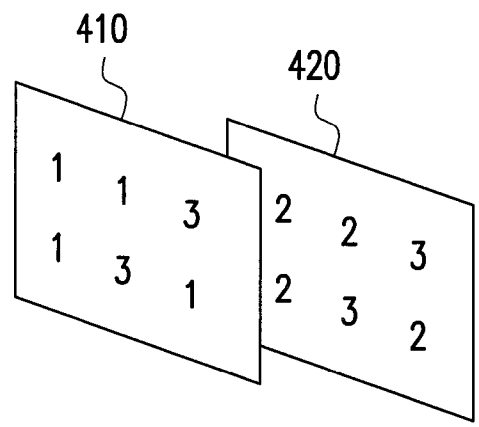
FIG. 4B is a schematic diagram illustrating image data generated in step S120 in FIG. 1 according to an embodiment of the invention.

After the first image data 410 and the second image data 420 in FIG. 4A are analyzed in step S120, some pixels in the pixel matrixes may be changed to the third state Z3. FIG. 4B is a schematic diagram illustrating image data generated in step S120 in FIG. 1 according to an embodiment of the invention. As indicated in FIG. 4B, pixels of the first image data 410 are in the first state and the third state, and pixels of the second image data 420 are in the second state and the third state. Contents of pixels in the third state can be received by both the left and the right eyes of the viewer. It should be mentioned that the pixel matrixes and distributions of the image data are not limited to those described in the present embodiment. When some pixels of the first image data 410 are in the third state, the first image data 410 presents a double-eye mixed vision when being played. Alternatively, when some pixels of the second image data 420 are in the third state, the second image data 420 presents the double-eye mixed vision when being played. Namely, the pixels in the first state (marked as "1" in FIG. 4B) serve to generate a left-eye vision (a single eye vision), the pixels in the second state (marked as "2" in FIG. 4B) serve to generate a right-eye vision (a single eye vision), and the pixels in the third state (marked as "3" in FIG. 4B) serve to generate a double-eye vision. In this embodiment, some pixels of the first image data 410 or the second image data 420 may be in the third state. Thus, the double-eye mixed vision helps improve the image quality, brightness, and resolution, resolve the flickering issue, and bring comfort to the viewer when 3D images are displayed.

Adjustment of Left and Right Images

When first image data and second image data respectively constitute the left-eye's view and the right-eye's view of the same image, the operation of analyzing the pixel P1(i, j, Z1) and the pixel P2(i, j, Z2) in the $i^{th}$ rows and the $j^{th}$ columns is equivalent to adjustment of a left image and a right image or adjustment of a right image and a left image.

In addition, a left image and a right image can be adjusted through the technique described in the following embodiment. Original image data are converted into first image data, second image data, third image data, and fourth image data. The first image data and the second image data are a first set of left and right eye image data, and the third image data and the fourth image data are a second set of left and right eye image data. Pixels in the first image data and the second image data at the same coordinates are respectively indicated as P1(Z1) and P2(Z2). Here, Z1 and Z2 respectively indicate the first state and the second state. Pixels in the third image data and the fourth image data at the same coordinates are respectively indicated as P3(Z1) and P4(Z2). The pixel P3(Z1) and the pixel P2(Z2) are analyzed. If a data difference between the pixel P2(Z2) and the pixel P3(Z1) is smaller than a threshold, the pixel P3(Z1) is changed to P3(Z3). Alternatively, the pixel P4(Z2) and the pixel P1(Z1) are analyzed. If a data difference between the pixel P1(Z1) and the pixel P4(Z2) is smaller than the threshold, the pixel P4(Z2) is changed to P4(Z3).

Figure 5:
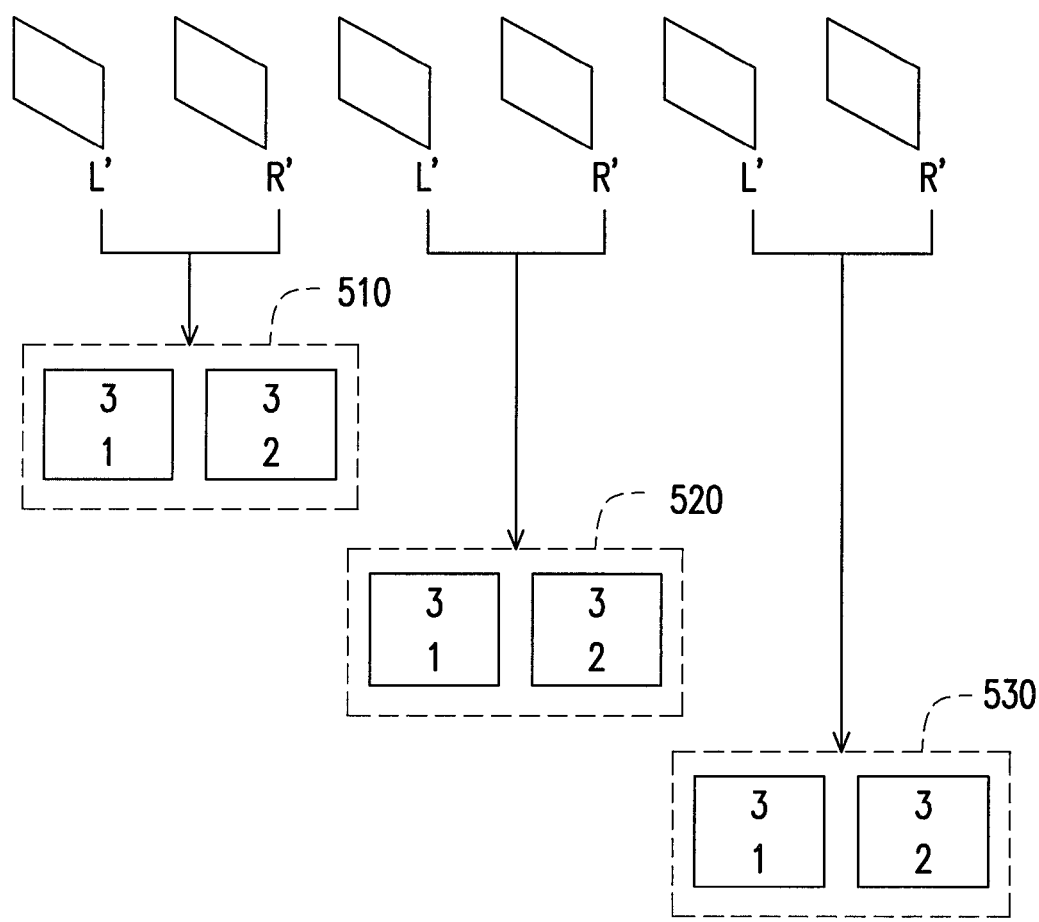
FIG. 5 is a schematic diagram illustrating the adjustment of a left image and a right image.

FIG. 5 is a schematic diagram illustrating the adjustment of a left image and a right image. Please refer to FIG. 5. In this embodiment, the first and second image data are respectively indicated as L' and R', and the first image data L' and the second image data R' belonging to the same set serve to generate a left-eye vision and a right-eye vision, so as to bring a 3D sensation to a viewer. In FIG. 5, the digits 1, 2, and 3 respectively denote the states (first state, second state, and third state) of pixels in each of the image data. A set of image data is generated after the left-eye image data L' and the right-eye image data R' are analyzed. For instance, as indicated in FIG. 5, an image data set 510 is generated after the first set of image data L' and R' are analyzed, an image data set 520 is generated after the second set of image data L' and R' are analyzed, and an image data set 530 is generated after the third set of image data L' and R' are analyzed. Taking the image data set 510 as an example, the analyzed image data set 510 has two image data. The first left-eye image data L' in FIG. 5 are converted into the first (left) image data in the image data set 510. Thus, the first image data in the image data set 510 constitute a sub-frame composed of pixels in both the first state and the third state. The first right-eye image data R' in FIG. 5 are converted into the second (right) image data in the image data set 510. Thus, the second image data in the image data set 510 constitute a sub-frame composed of pixels in both the second state and the third state. Since each set of image data contains pixels in the third state, each set of image data presents a double-eye mixed vision when it is played. Note that the states of pixels in each set of image data are not limited to those described in this embodiment. In addition, the adjusted image data may be played as a combination of a pure left-eye's view and a pure right-eye's view.

Two Images before and after Adjustment

In this embodiment, the first image data and the second image data respectively represent images at different time points. The above-mentioned operation of analyzing the pixel P1(Z1) and the pixel P2(Z2) at the same coordinates and different time points is equivalent to adjustment of two images at different time points. Similarly, when the second image data constitute a set of images, and the first image data constitute a next set of images, the operation of analyzing the pixel P2(Z2) and the pixel P1(Z1) at the same coordinates and different time points is equivalent to adjustment of two images at different time points.

FIG. 6 is a schematic diagram illustrating two images before and after adjustment. In this embodiment, left-eye and right eye image data are respectively indicated as L' and R', and the left-eye image data L' and the right-eye image data R' belonging to the same set serve to generate a left-eye vision and a right-eye vision, so as to bring a 3D sensation to a viewer. In FIG. 6, the digits 1, 2, and 3 respectively denote the states (first state, second state, and third state) of pixels in each of the image data. A set of image data is generated after images at different time points are analyzed. The two images may be left-eye and right-eye image data L' and R' of the same set or right-eye and left-eye image data R' and L' of different sets. In other embodiments, the two images may also be two right-eye image data R' or two left-eye image data L' of different sets.

For instance, image data 610 and 620 are generated after analyzing the first diamond frame (left-eye image data L') and the second diamond frame (right-eye image data R') in FIG. 6 (starting from the left). The first diamond frame (the left-eye image data L') in FIG. 6 is converted into the image data 610. Thus, the image data 610 constitute a sub-frame composed of pixels in both the first state and the third state. The second diamond frame (the right-eye image data R') in FIG. 6 is converted into the image data 620. Thus, the image data 620 constitute a sub-frame composed of pixels in both the second state and the third state. The second diamond frame (the right-eye image data R') and the third diamond frame (the left-eye image data L') in FIG. 6 can be analyzed to generate the image data 630. The third diamond frame (the left-eye image data L') in FIG. 6 is converted into the image data 630. Thus, the image data 630 constitute a sub-frame composed of pixels in both the first state and the third state. Similarly, after analyzing the third diamond frame (the left-eye image data L') and the fourth diamond frame (the right-eye image data R'), the fourth diamond frame (the right-eye image data R') is converted into the image data 640; after analyzing the fourth diamond frame (the right-eye image data R') and the fifth diamond frame (the left-eye image data L'), the fifth diamond frame (the left-eye image data L') is converted into the image data 650; after analyzing the fifth diamond frame (the left-eye image data L') and the sixth diamond frame (the right-eye image data R'), the sixth diamond frame (the right-eye image data R') is converted into the image data 660.

FIG. 6 illustrates a plurality of image data 610-660, and every two of the image data constitute a set of image data. As shown in FIG. 6, the image data 610 and 620 are the first set of image data, the image data 630 and 640 are the second set of image data, and the image data 650 and 660 are the third set of image data. Here, the image data 620, 640, and 660 are image data adjusted according to their positions, and the image data 610, 630, and 650 are image data adjusted according to their time sequence. In this embodiment, it should be mentioned that the image data to be adjusted can be grouped according to their positions, their time sequence, or a combination of position and time sequence. Since the operation speed on image data grouped according to their time sequence is faster than that on the image data grouped according to their positions, the two images adjusted at different time points can easily achieve the technical effect as shown in FIG. 4B in which the image data contain pixels in the third state.

Adjustment of a Left Image and a Right Image and Two Images at Different Time Points The method for adjusting a left image and a right image and two images at different points includes following steps. Original image data are converted into third image data. The third image data have a matrix with M*N pixels, the pixel in the $i^{th}$ row and the $j^{th}$ column of the third image data is indicated as P3(i, j, Z1), i and j are integers, $1 \leq i \leq M$, $1 \leq j \leq N$, and Z1 indicates a first state. The image contents of the pixel P2(i, j, Z2) and the pixel P3(i, j, Z1) in the $i^{th}$ rows and the $j^{th}$ columns are analyzed. If the data difference between the pixel P2(i, j, Z2) and the pixel P3(i, j, Z1) is smaller than a threshold, the pixel P3(i, j, Z1) is changed to P3(i, j, Z3), and the analyzed and adjusted third image data contain pixels in the third state.

About the Threshold Range of the Data Difference between the Pixel P2(i, j, Z2) and the Pixel P3(i, j, Z1)

The two pixel data are considered the same if following conditions are met in the step of analyzing the pixel P2(i, j, Z2) and the pixel P3(i, j, Z1): (1) when the grayscale variations of the two pixels are smaller than 10 grayscale units; (2) when the luminance variations of the two pixels are smaller than 5 luminance units; (3) when the deltaE of the two pixels is smaller than 1 deltaE unit. Note that the present implementation serves as an example but is not intended to limit the invention. The two pixel data may be considered the same if only one or two of foregoing conditions are met, or the range of the grayscale variation, the luminance variation, or deltaE may be changed according to the actual design requirement.

Please refer to FIG. 6. In this embodiment, the image data 620, 640, and 660 are image data adjusted according to their positions, and the image data 630 and 650 are image data adjusted according to their time sequence. Since both a left image and a right image and two images at different time points are adjusted, the first image data and the second image data are respectively the left-eye's view and the right-eye's view of the same image, and the third image data constitute the left-eye's view of the next image. In this case, the step of analyzing the pixel P1(i, j, Z1) and the pixel P2(i, j, Z2) is equivalent to adjusting a left image and a right image, and the step of analyzing the pixel P2(i, j, Z2) and the pixel P3(i, j, Z1) is equivalent to adjusting two images at different time points.

Similarly, the first image data and the second image data are respectively the right-eye's view and the left-eye's view of the same image, and the third image data constitute the right-eye's view of the next image. Thus, the step of analyzing the pixel P1(i, j, Z1) and the pixel P2(i, j, Z2) is equivalent to adjusting a right image and a left image, and the step of analyzing the pixel P2(i, j, Z2) and the pixel P3(i, j, Z1) is equivalent to adjusting two images at different time points.

Various Adjustment Techniques

In a pixel-based adjustment technique, in addition to those pixels having their grayscales unchanged, the grayscale variation between two pixels can be smaller than 10 (for instance, 6), or the total grayscale variation within three frame range is smaller than 10, and the pixel is set to be in the third state. Thus, the third state can be determined based on the image variation itself or at least three image variations.

In the adjustment of 3D information, a 3D image composed of pixels in the first to the third states can be generated through conversion by applying a specific depth data method or pre-load pixel comparison.

In the depth data method, an area having a specific depth is defined to be in, the third state, and other areas are sequentially defined to be in the first state and the second state. Alternatively, the depth of the area falls within a specific range (e.g., the depth is smaller than 10).

In the pre-load pixel comparison, the variation of each image before and after depth information is loaded is determined. The third state can be entered as long as the image variation is within a specific range (for instance, the grayscale is within 10 units; the luminance is smaller than 5 luminance units, or the deltaE is smaller than 1 deltaE unit). The details of this technique can be referred to as the descriptions regarding the similarities and dissimilarities analyzer of the 3D image in FIG. 2.

As to the conversion using a similarities and dissimilarities analyzer of the 3D information or through a depth-to-state transfer, a depth data method and a pre-load pixel comparison method can be applied. The depth data method is to compare 2D image data and depth data to generate depth data having the third state. The pre-load pixel comparison method is to generate the left image data (i.e., the first image data) and the right image data (i.e., the second image data) having pixels in the third state according to the 2D image data and the depth data.

3D Display of Pixels in the Third State

The analyzed and adjusted image data correspond to different 3D displays and display techniques. Pixels of each of the image data may be in the first state, the second state, or the third state. The output methods include a pre-definition method and a direct analysis method.

In the pre-definition method, when a specific pixel is indicated as Pixel(R,G,B), the contents and the state of the pixel can be indicated as Pixel(R,G,B,StateX), wherein the state StateX=1, 2, or 3.

In the direct analysis method, Block(N)=StateX, wherein the state StateX=1, 2, or 3, and the adjusted pixel is indicated as Pixel"(R,G,B). A pixel group at a plurality of spatial positions constitutes a block. In the block, a plurality of pixels Pixel(R,G,B,StateX) can be first adjusted and then converted through the pre-definition method. The state of the entire block can be determined by averaging the pixels in the block, through analysis of spatial proportions of the pixels in the block, or by calculating states of corresponding pixels in frames at different time points (similar to the analysis conducted by a similarities and dissimilarities analyzer).

The analyzed and adjusted image data can be applied to the polarized 3D technique and naked-eye 3D technique. The control of polarization is carried out in unit of block (composed of a plurality of pixels). Even though a block has a plurality of pixels, the pixels can only be in one state for polarization control. FIG. 7 to FIG. 9 are schematic diagrams illustrating the control of three blocks according to an embodiment of the invention. In FIG. 7 to FIG. 9, a first state to a third state of different pixels are respectively indicated by the digits 1-3.

In FIG. 7, the state corresponding to more than half of the pixels is considered a main state. A block is composed of a plurality of pixels. With reference to the upper half of FIG. 7, when the state corresponding to more than half of the pixels in the block 701 is the first state Z1, the entire block 701 serves to provide a left-eye vision to a viewer, such that a control unit corresponding to the block 701 in the active polarizing layer (or a controllable polarization layer) is turned into the first state (for instance, a polarization direction at 135°). Similarly, when the state corresponding to more than half of the pixels in the block is the second state Z2, the entire block serves to provide a right-eye vision to the viewer, so that the control unit corresponding to the block in the active polarizing layer is turned into the second state (for instance, a polarization direction at 45°. With reference to the lower half of FIG. 7, when the state corresponding to more than half of the pixels in the block 703 is the third state Z3, the entire block 703 serves to provide a double-eye vision to the viewer, so that the control unit corresponding to the block 703 in the active polarizing layer is turned into the third state (for instance, a polarization direction at 90°. Accordingly, the states of all the pixels in the block 701 are further changed to the first state Z1, and the states of all the pixels in the block 703 are further changed to the third state Z3.

FIG. 8 illustrates a space center method. The block 801 is composed of a plurality of pixels. When the pixel at the center of the block 801 is in the first state, the entire block 801 serves to provide a left-eye vision to a viewer, so that the states of all the pixels in the block 801 are further changed to the first state Z1. Accordingly, the control unit corresponding to the block 801 in the active polarizing layer is turned into the first state. Similarly, when the pixel at the center of the block is in the second state, the entire block serves to provide a right-eye vision to the viewer, so that the states of all the pixels in the block are further changed to the second state Z2. When the pixel at the center of the block is in the third state, the entire block serves to provide a double-eye vision to the viewer, so that the states of all the pixels in the block are further changed to the third state Z3.

FIG. 9 illustrates a state method. As shown in FIG. 9, the block 901 is composed of a plurality of pixels. When at least one of the pixels in the block 901 is in the first state Z1, the entire block 901 serves to provide a left-eye vision to a viewer, so that the states of all the pixels in the block 901 are further changed to the first state Z1. Accordingly, the control unit corresponding to the block 901 in the active polarizing layer is turned into the first state. Similarly, when at least one of the pixels in a block is in the second state Z2, the entire block serves to provide a right-eye vision to the viewer, so that the states of all the pixels in the block are further changed to the second state Z2. When all the pixels in a block are in the third state, the entire block serves to provide a double-eye vision to the viewer.

Additionally, images composed of pixels in the third state, the first state, and the second state can be respectively fine-tuned to enhance the 3D visual effect. For instance, regarding an image composed of pixels in the first state, the second state, and the third state, the display characteristic of a pixel can be adjusted according to a first image adjustment data combination (image profile) or a second image adjustment data combination. The aforementioned display characteristic may be luminance, contrast, and/or color saturation. In some embodiments, the first image adjustment data combination can increase the contrast and color saturation of pixels in the first state and the second state and reduce the brightness thereof, and the second image adjustment data combination can increase the brightness of pixels in the third state.

Figure 10:
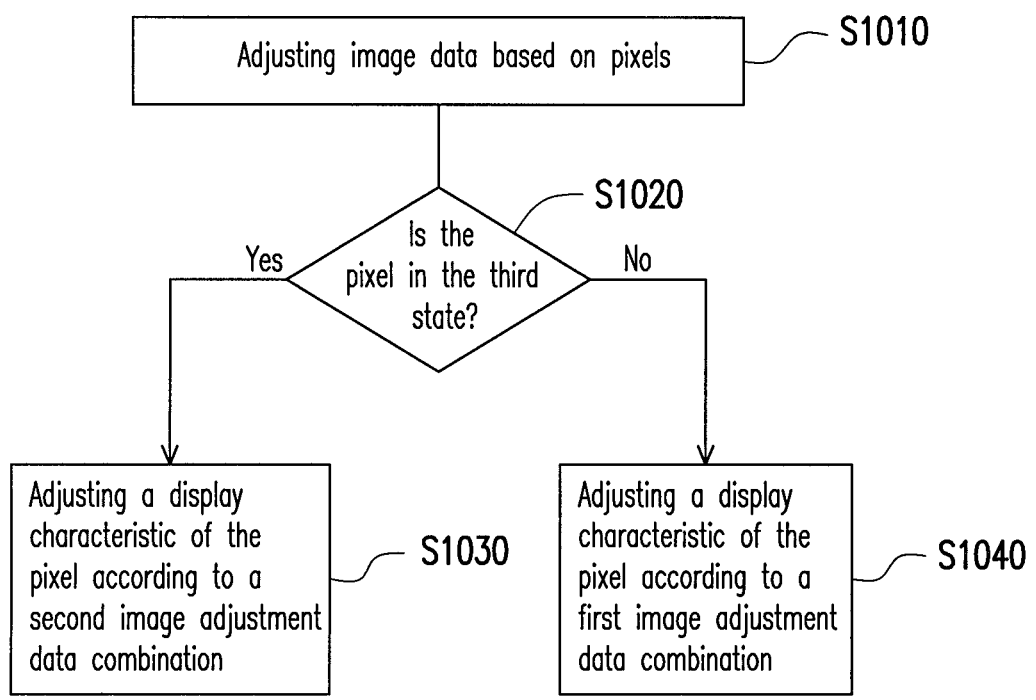
FIG. 10 is a schematic diagram illustrating 3D output according to an embodiment of the invention.

FIG. 10 is a schematic diagram illustrating 3D output according to an embodiment of the invention. In step S1010, image data are adjusted based on pixels. In step S1020, whether a pixel is in the third state is determined. If the pixel is determined to be in the third state, step S1030 is executed, in which the display characteristic of the pixel is adjusted (for instance, the brightness of the pixel in the third state is increased) according to the second image adjustment data combination. If the pixel is determined not to be in the third state, step S1040 is executed, in which the display characteristic of the pixel is adjusted (for instance, increase the contrast and color saturation of pixels in the first state and the second state and reduce the brightness thereof) according to the first image adjustment data combination. However, the output method in the invention is not limited thereto. For instance, general image adjustment parameters include skin color, gamma, a specific color axis, and so on. An image is adjusted according to the pixel contents of the image so as to change the corresponding values of the red, green, and blue primary colors.

Output of Pre-definition Method

Figure 11:
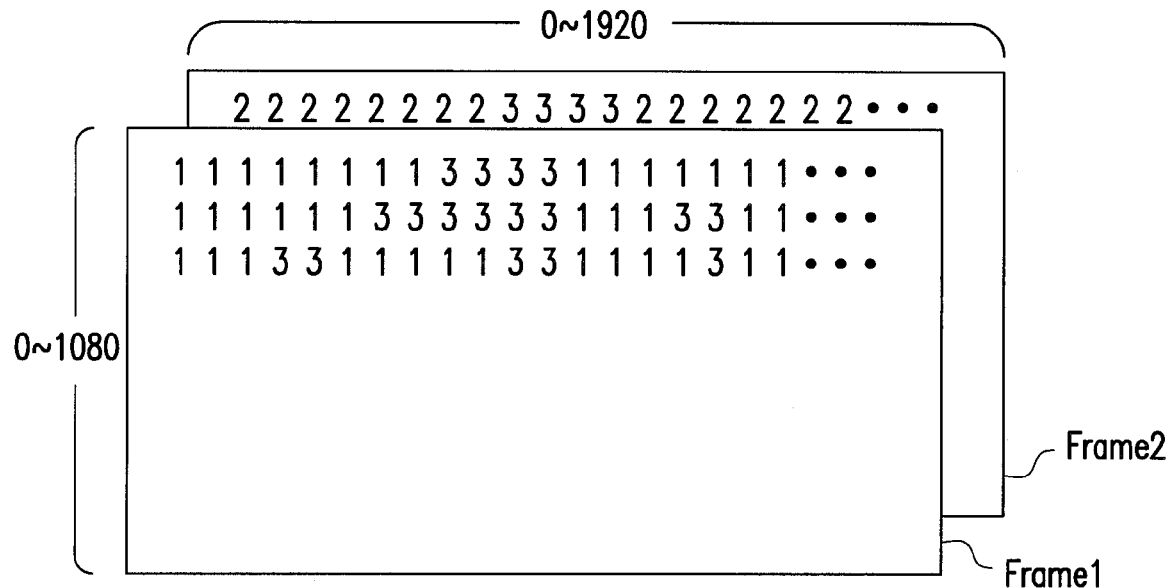
FIG. 11 is a schematic diagram illustrating the output of a pre-definition method, in which a pixel is converted into a surface result.

FIG. 11 is a schematic diagram illustrating the output of a pre-definition method, in which a pixel is converted into a surface result. Please refer to FIG. 11. A converter is employed in the system, and the state StateX of each pixel in each of the image data is re-distributed, so that the pixel can be easily converted into a surface result. Here, the image data Frame1 (x=0~1920, y=0~1080, t=1), the image data Frame2 (x=0~1920, y=0~1080, t=2), State(x, y, t)=X, and X=1/2/3.

Output of Direct Analysis Method

In the direct analysis method, Block(N)=StateX, wherein X=1/2/3, and the adjusted pixel is indicated as Pixel"(R, G, B). The states of different blocks are sequentially loaded. If the corresponding position of a block has been pre-defined, 3D control units can be directly controlled without any converter.

In different 3D techniques, the result is sent to a position converter for analysis, and a control signal is input into a 3D state controller to control each pixel. Moreover, if the 3D state controller has the same state at different time points, no output is done in order to increase the response speed of the system and reduce the power consumption of the system.

3D Mode (Mixed Timing Mode) of Pixel-based Image Data

A pixel-based mode having the third state mixed in the left and right image data is referred to as a mixed timing mode. The mixed timing mode can be applied to any existing 3D display technique, such as the polarized glasses 3D technique and various naked-eye 3D techniques. The mixed timing mode may be implemented differently. If the first image data are assumed to be a pure left image or a left image based on the first image adjustment data combination, the second image data are then a pure right image or a right image based on the first image adjustment data combination.

Figure 12:
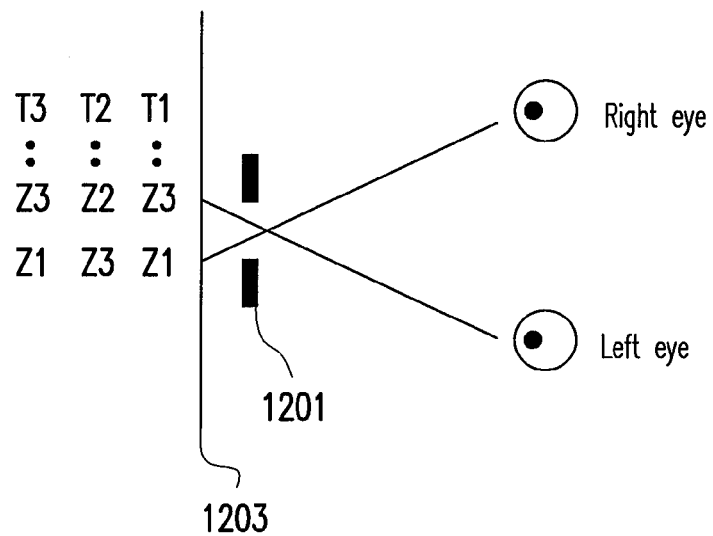
FIG. 12 is a schematic diagram illustrating a barrier 3D according to an embodiment of the invention.

FIG. 12 is a schematic diagram illustrating a barrier 3D according to an embodiment of the invention. At the time point T1, the right and left eyes of the viewer respectively detect pixels in the first state Z1 and pixels in the third state Z3 in the display panel 1203 through the barrier 1201. At the time point T2, the right and left eyes of the viewer respectively detect pixels in the third state Z3 and pixels in the second state Z2 in the display panel 1203 through the barrier 1201. At the time point T3, the right and left eyes of the viewer respectively detect pixels in the first state Z1 and pixels in the third state Z3 in the display panel 1203 through the barrier 1201.

The technique described in the foregoing embodiment can be applied to a naked-eye 3D barrier or a liquid crystal lens. For instance, the technique can be applied to the ultra 3D liquid crystal (LC) lens manufactured by AU Optronics (AUO), in which a display with a high refreshing rate (greater than 100 Hz to 120 Hz) is utilized. As to a naked-eye 3D technique, regional (or pixel) 3D and 2D switch control needs to be performed. A region of a display provided by AUO can serve to display 2D images. Thus, the left-eye's view and right-eye's view in the original 3D region can be directly used as a left-eye's view and a right-eye's view in the 2D region, while the original 2D region can be used for displaying a double-eye mixed vision.

Compared to the image data in a conventional technique, the image data analyzed and adjusted based on pixels can almost achieve their full native resolution. Besides, because the brightness detected by the other eye is gradually increased, the image quality can be improved.

Pixel-Based Application on Display (Mixed Timing Mode)

The pixel-based analysis result can be used in the polarization 3D technique and the naked-eye 3D technique for two purposes: to generate a third state and provide image contents. The polarized 3D technique may be applied in an active polarizer, for instance, and the naked-eye 3D technique may be applied to a barrier and a liquid crystal (LC) lens. Some LC lenses are formed by modification in the polarization and can thus act as the active polarizer. Namely, problems of applying the polarization 3D technique and the naked-eye 3D technique can be resolved in the invention.

Figure 13:
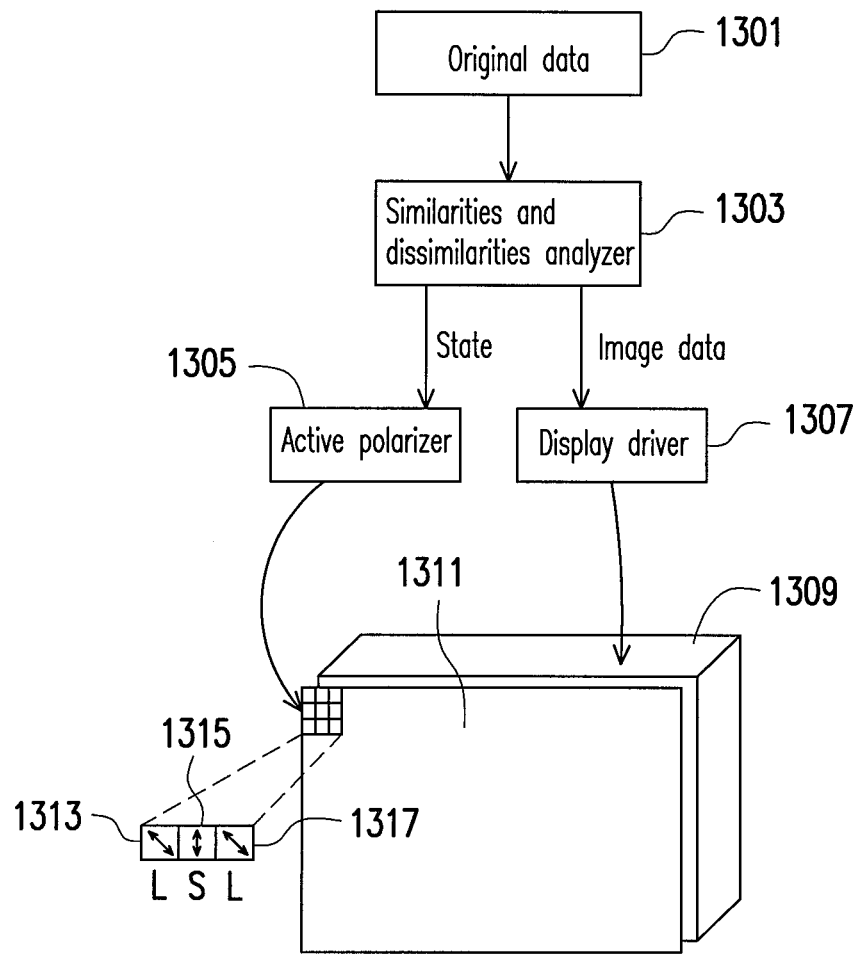
FIG. 13 is a structural diagram illustrating 3D display according to an embodiment of the invention.

FIG. 13 is a structural diagram illustrating an active polarizing 3D display apparatus according to an embodiment of the invention. With reference to FIG. 13, an image displayed by the display panel 1309 is detected by a viewer through an active polarizing layer 1311, and the viewer enjoys the image displayed on the display panel 1309 by wearing a pair of polarized glasses. Here, it is assumed that the polarization direction of the left lens of the polarized glasses is at 135°, and that the polarization direction of the right lens is at 45°. The original data 1301 are analyzed and adjusted by the similarities and dissimilarities analyzer 1303, so that image data can be output to the display driver 1307, and states of pixels are output to the active polarizer 1305. The display driver 1307 may include a timing controller, a source driver, and a gate driver. However, the invention is not limited thereto. The display driver 1307 can output each of the pixel data in the image data to the corresponding pixels of the LCD layer 1309.

The active polarizer 1305 controls the polarization direction of the active polarizing layer 1311. For instance, the polarization direction of the control unit 1313 is set as 135°, such that a left-eye vision L is provided to the viewer through the polarized glasses. Alternatively, the polarization direction of the control unit 1315 is set as 90°, such that a double-eye vision S is provided to the viewer through the polarized glasses. The polarization direction of the control unit 1317 can also be set as 135°, such that a left-eye vision L is provided to the viewer through the polarized glasses. Hence, the polarized light emitted by the control units 1313 and 1317 passes through the left lens of the polarized glasses but does not pass through the right lens thereof (because the angle between the polarization directions of the two is 90°. Since the polarization direction of the polarized light emitted by the control unit 1315 and the polarization direction of the left lens have a 45-degree angle therebetween, and the polarization direction of the polarized light emitted by the control unit 1315 and the polarization direction of the right lens have a 45-degree angle therebetween, part of the polarized light emitted by the control unit 1315 passes through the left lens and the right lens of the polarized glasses.

When a next image is displayed, the polarization direction of the control units 1313 and 1317 may be set as 45°, such that the a right-eye vision R is provided to the viewer through the polarized glasses, and the polarization direction of the control unit 1315 is set as 90°, such that a double-eye vision S is provided to the viewer through the polarized glasses. Hence, the polarized light emitted by the control units 1313 and 1317 passes through the right lens of the polarized glasses but does not pass through the left lens thereof. Part of the polarized light emitted by the control unit 1315 passes through the left lens and the right lens of the polarized glasses.

Figure 14:
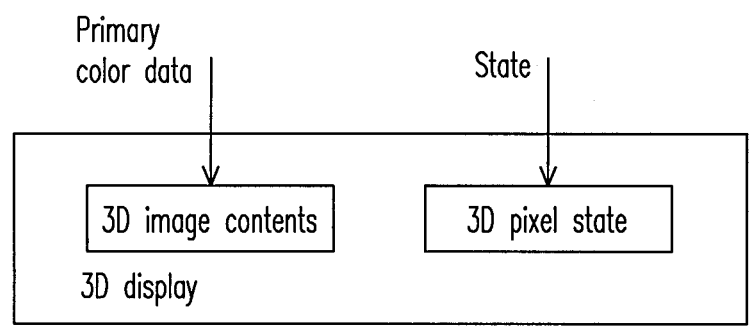
FIG. 14 is a schematic diagram illustrating a 3D display data surface according to an embodiment of the invention.

FIG. 14 is a schematic diagram illustrating a 3D display data surface according to an embodiment of the invention. Please refer to FIG. 14. The image data contain pixels in the 3D state, and the primary color data (red, green, and blue) in the image data provide 3D image contents. An adjustable 3D state unit (for instance, a 3D state controller, an active polarizer, a barrier, or a LC lens) can be applied to produce results of the first to the third state in optical properties. Certainly, the technique described above may also be applied to other high-speed display technology with the mixed timing characteristics.

Constitution of Display Panel and Active Polarizing Layer

The display panel is composed of a polarizing display or a non-polarizing display. The polarizing display is a liquid crystal display (LCD), for instance. Since the orientation of liquid crystal is characterized by polarization, the LCD can have a certain polarization direction. The non-polarizing display is an organic light emitting diode (OLED) display or a plasma display, for instance, and a back polarizing layer is located on the non-polarizing display, such that the non-polarizing display can have a certain polarization direction.

The active polarizing layer is a liquid crystal panel, for instance, and the liquid crystal panel includes a first electrode layer, a second electrode layer, and a liquid crystal layer located between the first electrode layer and the second electrode layer. The first and second electrode layers are driven by a driving signal output by the active polarizer, for instance, such that the liquid crystal in the liquid crystal layer is turned around to change the polarization direction. The active polarizing layer can further include a phase retardation unit that can convert linear polarization into circular polarization. Here, the linear polarization results from the liquid crystal of the liquid crystal panel which is turned around.

Figure 15A:
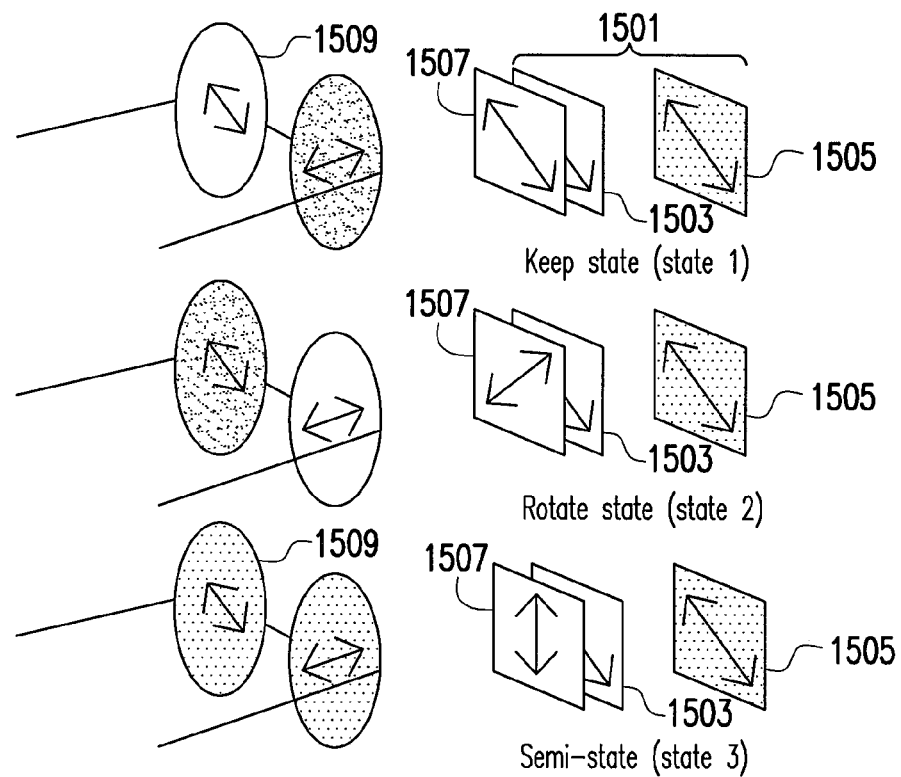
FIG. 15A and FIG. 15B are schematic diagrams illustrating an active polarizing layer according to an embodiment of the invention.
Figure 15B:
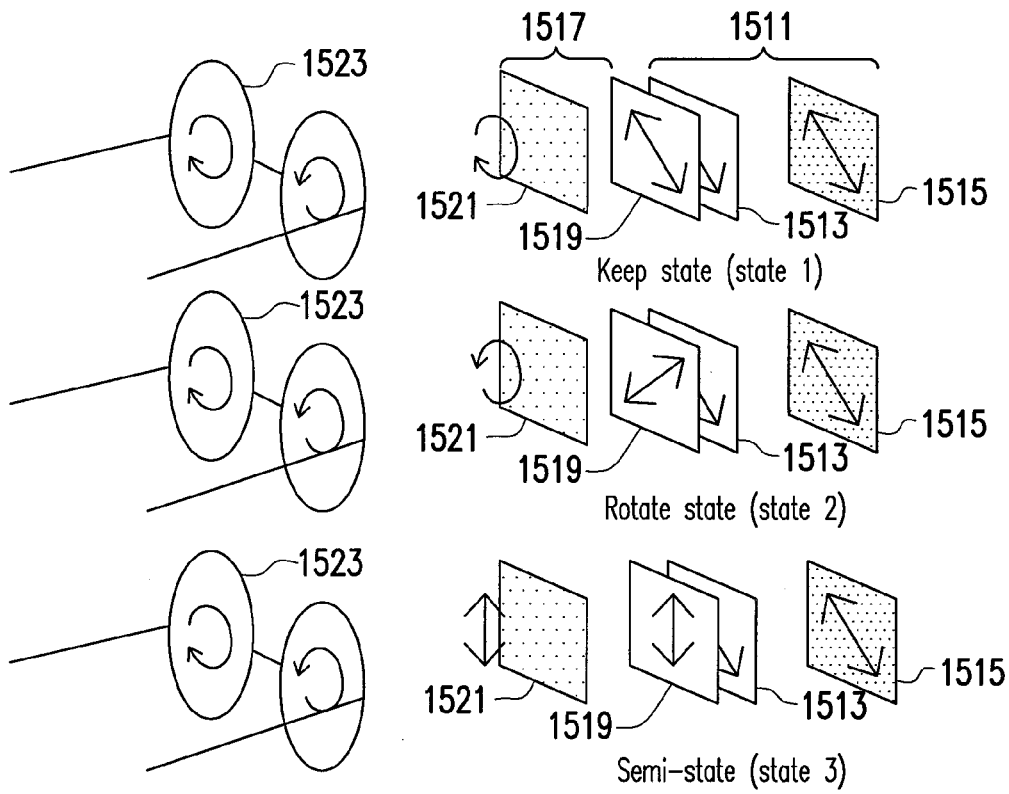
Figure 16:
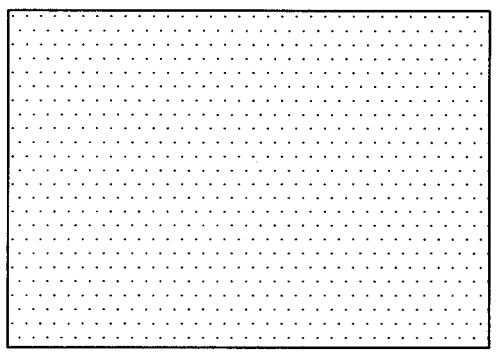
FIG. 16(a)~FIG. 16(d) are schematic diagrams illustrating a phase retardation unit according to an embodiment of the invention.
Figure 16:
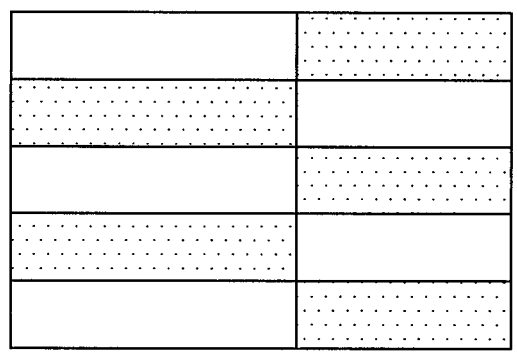
Figure 16:
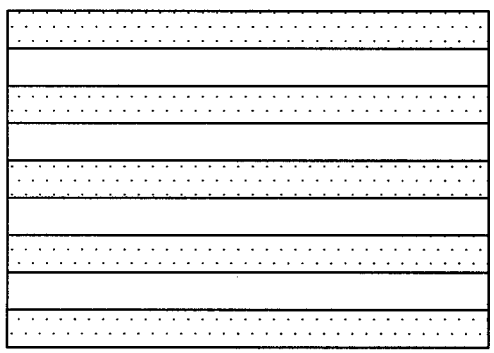
Figure 16:
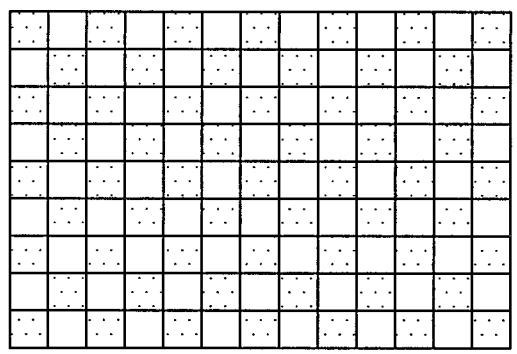

FIG. 15A and FIG. 15B are schematic diagrams illustrating an active polarizing layer according to an embodiment of the invention. With reference to FIG. 15A, a display panel 1501 is constituted by a non-polarizing display 1503 and a back polarizing layer 1505. Due to the polarization effects of the back polarizing layer 1505, the non-polarizing display 1503 has a polarization direction. The active polarizing layer 1507 is located on the display panel 1501 and controls direction change of the left-eye image (state 1), the right-eye image (state 2), and the same image (state 3), such that the image projected to the polarizing glasses 1509 by the non-polarizing display 1503 respectively has a polarization direction at 45°, 135°, and 90°. Thereby, a left-eye vision, a right-eye vision, and a double-eye vision can be respectively generated and provided to the viewer who wears the polarizing glasses 1509.

Similarly, with reference to FIG. 15B, a display panel 1511 is constituted by a non-polarizing display 1513 and a back polarizing layer 1515. Due to the polarization effects of the back polarizing layer 1515, the non-polarizing display 1513 has a polarization direction. The active polarizing layer 1517 is located on the display panel 1511 and includes a liquid crystal panel 1519 and a phase retardation unit 1521. The liquid crystal panel 1519 controls direction change of the left-eye image (state 1), the right-eye image (state 2), and the same image (state 3), such that the image projected by the non-polarizing display 1513 respectively has a polarization direction at 45°, 135°, and 90°. After the retardation action of the phase retardation unit 1521, the linear polarization is converted into the circular polarization. At this time, owing to the circular polarization characteristics of the polarizing glasses 1523, the left-eye vision, the right-eye vision, and the double-eye vision can be respectively generated and provided to the viewer who wears the polarizing glasses 1523.

In the aforesaid 3D display apparatus, the similarities and dissimilarities analyzer analyzes and processes one single pixel as a unit, while the similarities and dissimilarities analyzer can also process blocks composed of a plurality of pixels in another embodiment of the invention. Driving the blocks by the active polarizing layer is associated with driving the blocks by the display panel. Due to polarization in the blocks driven by the active polarizing layer, the polarization directions of images shown on each block in the display panel can be different, and the phase retardation unit and the back polarizing layer can also achieve different retardation (polarization) effects based on the definition of the blocks.

To be more specific, the phase retardation unit can be designed in consideration of a whole block or individual blocks, and said design must take account of the three states of pixels in image data shown on the display panel and take space and time into consideration. FIG. 16(a)~FIG. 16(d) are schematic diagrams illustrating a phase retardation unit according to an embodiment of the invention. As shown in FIG. 16(a)~FIG. 16(d), the phase retardation unit can be designed to be planar (shown in FIG. 16(a)), can have irregularly arranged blocks (shown in FIG. 16(b)), can have transverse, bar-shaped blocks (shown in FIG. 16(c)), or can have regularly arranged blocks (shown in FIG. 16(d)). Different polarization effects can be achieved when light passes through the blocks shown in FIG. 16(a)~FIG. 16(d).

Synchronization of Active Polarizing Layer and Display Panel and Fine-tuning Time of Different States In an embodiment of the invention, the blocks of the active polarizing layer are driven in the same order as that of driving the display panel. Namely, the active polarizing layer and the display panel need to be synchronized and updated at the same frequency. Specifically, when the active polarizer sends the driving signal at the state 1, the active polarizing layer can be controlled to turn to the polarization direction corresponding to the state 1, so as to generate the left-eye image. When the active polarizer sends the driving signal at the state 2, the active polarizing layer can be controlled to turn to the polarization direction corresponding to the state 2, so as to generate the right-eye image and ensure that the effective time of the left-eye image display is equal to the effective time of the right-eye image display. The initial time at which the active polarizer sends the driving signal at the state 1 and the state 2 can be different, such that the liquid crystal can attain to the stable state within the same time frame. Besides, the active polarizer can accelerate or the centralize the driving signal sent thereby, such that the polarization state of the active polarizing layer can be fixed as soon as possible.

According to the previous embodiment, the liquid crystal panel having the update frequency at 120 Hz is applied in both the display panel and the active polarizing layer, for instance. However, in another embodiment of the invention, the liquid crystal panel having the update frequency at 240 Hz is also applicable to the display panel. Namely, the liquid crystal panel of the active polarizing layer can have the update frequency (at 120 Hz) smaller than the update frequency of the liquid crystal panel of the display panel.

Fine-tuning Time of Different States

Within the time frame of displaying the left-eye image on the display panel, the driving signal at the state 1 can be slightly advanced or delayed (moving forward and backward on a sequence diagram, or even slightly exceeding the time frame). What is more, the driving signal as a whole can be delayed to the next frame according to the design of the display panel. That is to say, the driving signal of the active polarizing layer can be delayed to the next left-eye or right-eye image.

Figure 17C:
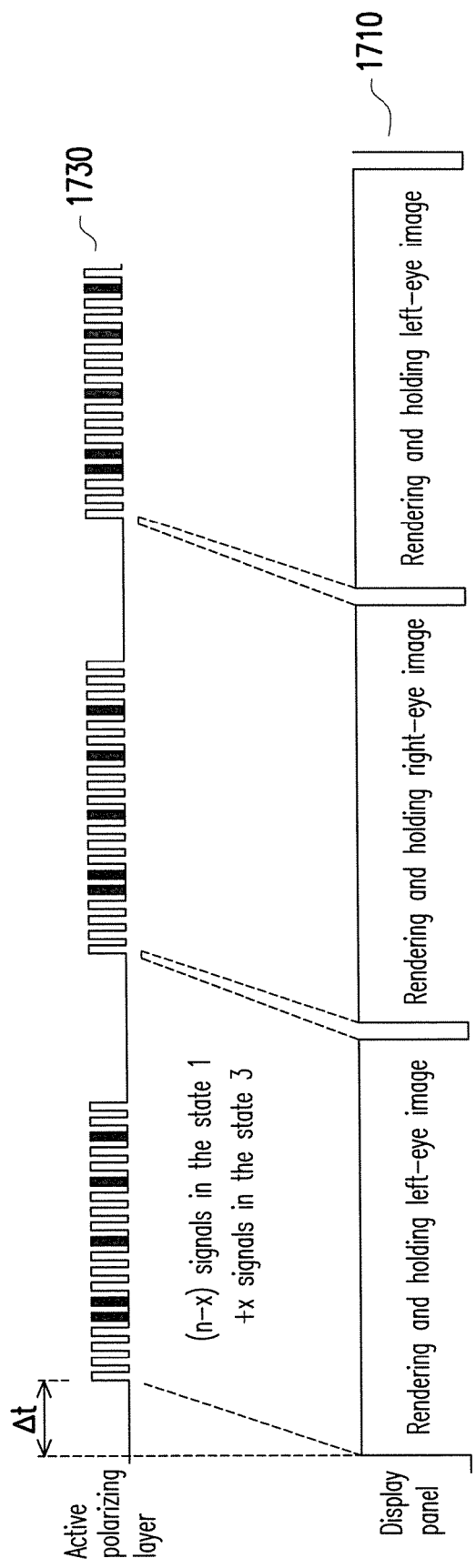

FIG. 17A to FIG. 17C are schematic diagrams illustrating driving signals of an active polarizing layer and a display panel according to an embodiment of the invention. With reference to FIG. 17A, the driving signal 1710 generated by the display driver is sent to the display panel in the order of left, right, and left eye images, so as to control the display panel to display images. The driving signal 1720 generated by the active polarizer is sent to the display panel at a relatively late time (i.e., the time delay is Δt). Besides, based on the difference in the states, the driving signal 1720 can be categorized into x signals in the state 3 and (n-x) signals in the state 1. Here, n and x are positive integers, and n is greater than x. That is to say, the active polarizer must completely send the x signals in the state 3 and the (n-x) signals in the state 1 in the first image frame.

FIG. 17B is an enlarged view of the driving signal 1720. In FIG. 17B, a signal 1721 in the state 1 at the end of the first image frame, a signal 1723 in the state 2 in the second image frame, and a signal 1725 in the state 3 in the second image frame are shown. As indicated in FIG. 17B, when the signal 1720 in the state 1 is taken as a base line, the signal 1723 in the state 2 and the signal 1725 in the state 3 can both be slightly advanced or delayed (moving forward or backward on a sequence diagram). Alternatively, the signals can be sent at the same time phase, while using a buffer to process the time delay of the signals in the states 1, 2, and 3.

As shown in FIG. 17C, the active polarizer can send the driving signal 1730 in an accelerated manner or centralize the driving signal 1730, such that the polarization state of the active polarizing layer can be fixed as soon as possible. In comparison with the driving signal 1730, the driving signal 1720 of the display panel can be sent at a relatively slow or a normal pace.

It should be mentioned that the smallest block as exemplified in the 3D display apparatus is determined by partitioning the pixels. At this time, the resolution of the display panel is the same as the resolution of the active. polarizing layer having blocks, and the display panel and the active polarizing layer having blocks are synchronously updated. Said technique is applicable to the polarizing display that includes an OLED display or a plasma display.

In addition, with reference to the drawings schematically illustrating the driving signal, the control of the active polarizing layer slightly falls behind the control of the display panel, which reflects the actual operation of a liquid crystal display (LCD). As a matter of fact, the control of the active polarizing layer can be at the same time as or earlier than the control of the display panel if the scanning backlight technique or other non-polarizing display techniques are applied. As long as the correct image can be displayed on the display panel when the active polarizing layer is in a stable state, the application does not depart from the spirit of the invention.

When the above technique is applied in a whole polarizing display (e.g., the LCD), it may accompany with turning on the backlight in the whole block; when the above technique is applied in a regional polarizing display, it may accompany with respectively turning on the backlight in the blocks and synchronizing the backlight with the active polarizing layer.

Moreover, when the above-mentioned technique is applied in a polarizing display that includes the OLED display or the plasma display, the active polarizing layer can be moved to a certain location before the pixels corresponding to the current image frame emit light and can then be further moved to the next location after the pixels emit light. Under this design, the update frequency of the display panel can be higher than or equal to the update frequency of the active polarizing layer.

Based on the above, in the 3D display apparatus described in the embodiments of the invention, the double-eye mixed vision is generated based on the pure left-eye's view and the pure right-eye's view, and the third state associated with double eyes is produced. Here, the pixels in the third state are configured in the analyzed image data and played in form of multiple image data. Thus, the 3D vision is presented, and the technique can be applied to the conventional polarized and shutter glasses. As such, the technique for adjusting the pixel state at least can resolve the flickering problem and improve the image quality, brightness, and resolution in 3D display.

Although the invention has been described with reference to the above embodiments, it will be apparent to one of the ordinary skill in the art that modifications to the described embodiment may be made without departing from the spirit of the invention. Accordingly, the scope of the invention will be defined by the attached claims not by the above detailed descriptions.

What is claimed is:

1. A three-dimensional display apparatus, comprising:
a display panel;
a display driver, coupled to the display panel, controlling the display panel to display an input image data, the input image data being categorized into data of a plurality of pixels in a first state, a second state, and a third state;
an active polarizing layer, located on the display panel; and
an active polarizer, coupled to the active polarizing layer, controlling a polarization direction of the active polarizing layer to make an image displayed on the display panel have the polarization direction after passing through the active polarizing layer; wherein
the polarization direction of the active polarizing layer is changed to a first polarization direction in response to the pixels in the first state in the display panel, the polarization direction of the active polarizing layer is changed to a second polarization direction in response to the pixels in the second state in the display panel, and the polarization direction of the active polarizing layer is changed to a third polarization in response to the pixels in the third state in the display panel.

2. The three-dimensional display apparatus as recited in claim 1, wherein the display panel is a polarizing display, and the polarizing display comprises a liquid crystal display.

3. The three-dimensional display apparatus as recited in claim 1, wherein the display panel comprises:
a non-polarizing display; and
a back polarizing layer, located on the non-polarizing display, making the pixels displayed on the non-polarizing display have a certain polarization direction.

4. The three-dimensional display apparatus as recited in claim 3, wherein the non-polarizing display comprises an organic light emitting diode display or a plasma display.

5. The three-dimensional display apparatus as recited in claim 1, wherein the active polarizing layer comprises:
a liquid crystal panel, comprising a first electrode layer, a second electrode layer, and a liquid crystal layer located between the first electrode layer and the second electrode layer; wherein
the first electrode layer and the second electrode layer are driven by a driving signal, so as to turn around liquid crystal in the liquid crystal layer and change the polarization direction.

6. The three-dimensional display apparatus as recited in claim 5, wherein the active polarizing layer further comprises:
a phase retardation unit, a first time at which the driving signal is inputted to the liquid crystal panel earlier than or later than a second time at which the display panel displays the input image data to make the liquid crystal in the liquid crystal layer of the liquid crystal panel turn around and attain to a stable state, so as to change the polarization direction of the pixels displayed on the display panel.

7. The three-dimensional display apparatus as recited in claim 6, wherein the driving signal outputted to the display panel by the phase retardation unit has an update frequency, and the update frequency of the driving signal is lower than or equal to an update frequency of the input image data displayed on the display panel.

8. The three-dimensional display apparatus as recited in claim 5, further comprising:
a similarities and dissimilarities analyzer, receiving original image data and converting the original image data into the input image data, the input image data comprising first image data and second image data, the pixels in the first image data and the second image data respectively having a coordinate represented by $P1(Z1)$ and $P2(Z2)$, wherein $Z1$ and $Z2$ respectively indicate the first state and the second state, the pixel in the first state is played for generating a left-eye vision to a viewer, and the pixel in the second state is played for generating a right-eye vision to the viewer, the similarities and dissimilarities analyzer analyzing the pixel P1(Z1) and the pixel P2(Z2), wherein when a data difference between the pixel P1(Z1) and the pixel P2(Z2) is smaller than a threshold, the pixel P1(Z1) is changed to P1(Z3), the pixel P2(Z2) is changed to P2(Z3), or the pixels Pl(Z1) and P2(Z2) are respectively changed to P1(Z3) and P2(Z3), wherein Z3 indicates the third state, and the pixel in the third state is played for generating a double-eye vision to the viewer.

9. The three-dimensional display apparatus as recited in claim 8, wherein the similarities and dissimilarities analyzer further categorizes the input image data into a plurality of blocks and determines the pixels in each of the blocks to be in the first state, the second state, or the third state by analyzing states of the pixels in the each of the blocks.

10. The three-dimensional display apparatus as recited in claim 9, wherein when more than half of the pixels in each of the blocks are in the first state, the similarities and dissimilarities analyzer determines the pixels in each of the blocks to be in the first state; when more than half of the pixels in the each of the blocks are in the second state, the similarities and dissimilarities analyzer determines the pixels in the each of the blocks to be in the second state; and when more than half of the pixels in the each of the blocks are in the third state, the similarities and dissimilarities analyzer determines the pixels in the each of the blocks to be in the third state.

11. The three-dimensional display apparatus as recited in claim 9, wherein when the pixels at a center of the each of the blocks are in the first state, the similarities and dissimilarities analyzer determines the pixels in the each of the blocks to be in the first state; when the pixels at the center of the each of the blocks are in the second state, the similarities and dissimilarities analyzer determines the pixels in the each of the blocks to be in the second state; and when the pixels at the center of the each of the blocks are in the third state, the similarities and dissimilarities analyzer determines the pixels in the each of the blocks to be in the third state.

12. The three-dimensional display apparatus as recited in claim 9, wherein the threshold is 10 grayscale units, 5 luminance units, or 1 deltaE unit.

13. The three-dimensional display apparatus as recited in claim 9, wherein the active polarizing layer further comprises:
a phase retardation unit, a third time at which the driving signal of the each of the blocks in the second state and the third state are inputted to the liquid crystal panel earlier than or later than a fourth time of outputting the driving signal of the each of the blocks in the first state.

14. The three-dimensional display apparatus as recited in claim 8, wherein the similarities and dissimilarities analyzer further converts the original image data into third image data and fourth image data, the first image data and the second image data are a first set of left and right eye image data, the third image data and the fourth image data are a second set of left and right eye image data, and pixels in the third image data and the fourth image data respectively have a coordinate represented by P3(Z1) and P4(Z2); wherein
the similarities and dissimilarities analyzer analyzes the pixel P3(Z1) and the pixel P2(Z2), and the pixel P3(Z1) is changed to P3(Z3) when a data difference between the pixel P2(Z2) and the pixel P3(Z1) is smaller than the threshold, or the similarities and dissimilarities analyzer analyzes the pixel P4(Z2) and the pixel P1 (Z1), and the pixel P4(Z2) is changed to P4(Z3) when a data difference between the pixel P1(Z1) and the pixel P4(Z2) is smaller than the threshold.

15. The three-dimensional display apparatus as recited in claim 8, wherein the similarities and dissimilarities analyzer further determines whether the pixel is in the third state; when the pixel is determined not to be in the third state, a display characteristic of the pixel is adjusted according to a first image adjustment data combination; and when the pixel is determined to be in the third state, the display characteristic of the pixel is adjusted according to a second image adjustment data combination.

16. The three-dimensional display apparatus as recited in claim 5, further comprising:
a similarities and dissimilarities analyzer, receiving original image data and converting the original image data into the input image data, the input image data comprising first image data and second image data; wherein the first image data and the second image data respectively have a matrix with M*N pixels, the pixels in $i^{th}$ rows and $j^{th}$ columns of the first image data and the second image data are respectively indicated as P1(i, j, Z1) and P2(i, j, Z2), i and j are integers, $1 \leq i \leq M$, $1 \leq j \leq N$, Z1 and Z2 respectively indicate the first state and the second state, the pixel in the first state is played for generating a left-eye vision to a viewer, and the pixel in the second state is played for generating a right-eye vision to the viewer, the pixel P1(i, j, Z1) and the pixel P2(i, j, Z2) in the $i^{th}$ rows and the $j^{th}$ columns are analyzed, if a data difference between the pixel P1(i, j, Z1) and the pixel P2(i, j, Z2) is smaller than a threshold, the pixel P1(i, j, Z1) is changed to P1(i, j, Z3), the pixel P2(i, j, Z2) is changed to P2(i, j, Z3), or the pixels P1(i, j, Z1) and P2(i, j, Z2) are respectively changed to P1(i, j, Z3) and P2(i, j, Z3), Z3 indicates a third state, and the pixel in the third state is played for generating a double-eye vision to the viewer.

17. The three-dimensional display apparatus as recited in claim 16, wherein the similarities and dissimilarities analyzer further categorizes the input image data into a plurality of blocks and determines the pixels in each of the blocks to be in the first state, the second state, or the third state by analyzing states of the pixels in the each of the blocks.

18. The three-dimensional display apparatus as recited in claim 17, wherein when more than half of the pixels in the each of the blocks are in the first state, the similarities and dissimilarities analyzer determines the pixels in the each of the blocks to be in the first state; when more than half of the pixels in the each of the blocks are in the second state, the similarities and dissimilarities analyzer determines the pixels in the each of the blocks to be in the second state; and when more than half of the pixels in the each of the blocks are in the third state, the similarities and dissimilarities analyzer determines the pixels in the each of the blocks to be in the third state.

19. The three-dimensional display apparatus as recited in claim 17, wherein when the pixels at a center of the each of the blocks are in the first state, the similarities and dissimilarities analyzer determines the pixels in the each of the blocks to be in the first state; when the pixels at the center of the each of the blocks are in the second state, the similarities and dissimilarities analyzer determines the pixels in the each of the blocks to be in the second state; and when the pixels at the center of the each of the blocks are in the third state, the similarities and dissimilarities analyzer determines the pixels in the each of the blocks to be in the third state.

20. The three-dimensional display apparatus as recited in claim 16, wherein the similarities and dissimilarities analyzer further converts the original image data into third image data, the third image data have a matrix with M*N pixels, the pixel in the $i^{th}$ row and the $j^{th}$ column of the third image data is indicated as P3(i, j, Z1), i and j are integers, 1≤i≤M, 1≤j≤N, the similarities and dissimilarities analyzer analyzes image contents of the pixel P2(i, j, Z2) and the pixel P3(i, j, Z1) in the $i^{th}$ row and the $j^{th}$ column, and if a data difference between the pixel P2(i, j, Z2) and the pixel P3(i, j, Z1) is smaller than the threshold, the pixel P3(i, j, Z1) is changed to P3(i, j, Z3).

* * * * *